United States Patent [19]
Cosner et al.

[11] Patent Number: 6,068,218
[45] Date of Patent: *May 30, 2000

[54] AGILE, SPINNING SPACECRAFT WITH SUN-STEERABLE SOLAR CELL ARRAY AND METHOD

[75] Inventors: Christopher M. Cosner, Manhattan Beach; Scott M. Matsunami, Chatsworth; David L. Behrin, Culver City, all of Calif.

[73] Assignee: Hughes Electronics Corporation, El Segundo, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/855,684

[22] Filed: May 14, 1997

[51] Int. Cl.[7] .................................................. B64G 1/44

[52] U.S. Cl. ............................................................ 244/173

[58] Field of Search ................................. 244/164, 165, 244/169, 173, 158 R, 159; 250/203.4

[56] References Cited

U.S. PATENT DOCUMENTS

| | | | |
|---|---|---|---|
| 3,714,434 | 1/1973 | Mears, Jr. et al. | 250/203.4 |
| 4,374,579 | 2/1983 | Renner et al. | 244/158 R |
| 4,375,878 | 3/1983 | Harvey et al. | 244/158 R |
| 4,384,692 | 5/1983 | Preukschat | 244/158 R |
| 4,508,297 | 4/1985 | Mouilhayrat et al. | 244/173 |
| 4,725,023 | 2/1988 | Shiki | 244/173 |
| 4,728,061 | 3/1988 | Johnson et al. | 244/164 |
| 4,747,567 | 5/1988 | Johnson et al. | 244/173 |
| 4,752,884 | 6/1988 | Slafer et al. | 244/164 |
| 4,834,325 | 5/1989 | Faget et al. | 244/173 |
| 4,911,385 | 3/1990 | Agrawal et al. | 244/165 |
| 5,067,673 | 11/1991 | Fong | 244/165 |
| 5,228,644 | 7/1993 | Garriott et al. | 244/173 |
| 5,255,878 | 10/1993 | Rahn | 244/164 |
| 5,441,222 | 8/1995 | Rosen | 244/165 |

FOREIGN PATENT DOCUMENTS

| | | | |
|---|---|---|---|
| 132768 | 2/1985 | European Pat. Off. | 244/158 R |
| 60-148800 | 8/1985 | Japan . | |

OTHER PUBLICATIONS

Morgan, Walter L., et al., *Communications Satellite Handbook*, John Wiley & Sons, New York, 1989, pp. 547–554 and 636–641.

Marshall H. Kaplan, Modern Spacecraft Dynamics, pp. 240–269, 1976.

Miyoshi et al, "An Antenna Despun Spacecraft with GaAs Solar Cells for Communications Application," IAF paper 84–63 (Abstract only), Oct. 1984.

Chetty et al, "Enhanced Power Generation by Optical Solar Reflectors on Geostationary Spinners," IEEE pub. AES–15 (Abstract only), pp. 119–124, Jan. 1979.

Patent Abstracts of Japan, vol. 013, No. 567 (M–908), Dec. 15, 1989 & JP 01237296 A, (Mitsubishi Electric Corp), Sep. 21, 1989.

(List continued on next page.)

*Primary Examiner*—Peter M. Poon
*Assistant Examiner*—Charles R. Ducker, Jr.
*Attorney, Agent, or Firm*—T. Gudmestad; M. W. Sales

[57] ABSTRACT

An agile, spinning spacecraft has a first body portion and a second body portion which is rotatably coupled about a first rotational axis to the first body portion. A pair of planar solar cell arrays are rotatably coupled to the second body portion along a second rotational axis that is preferably orthogonal to the first rotational axis. The first body portion can be spun if desired and the first rotational axis can be directed by an attitude control system to have selected orientations. The solar cell arrays are rotated about the first and second rotational axes in accordance with steering laws which maintain the arrays in an orthogonal relationship with a Sun line.

15 Claims, 6 Drawing Sheets

OTHER PUBLICATIONS

Baraona, C. R.: "Photovoltaic Power For Space Sation Freedom" Record Of The Photovoltaic Specialists Conference, Kissimimee, May 21–25 1990, pp. 30–35, XP000480260, Institute of Electrical and Electronics Engineers.

Stoma S.A., Averbukh V. Ya, Leshchinskii E A: "Electromechanical Solar–Battery Orientation System For Artificial Satellites" Russian Electrical Engineering, vol. 67, No. 5, 1996, pp. 16–20, XP002078052, Allerton Press, USA.

Durling G. W.: "High Power And Pointing Accuracy From Body–Spun Spacecraft" Space Communication and Broadcasting, vol. 1, No. 1, Apr. 1983, pp. 65–71, XP002078053, North–Holland Publishing Company, Amsterdam Netherlands.

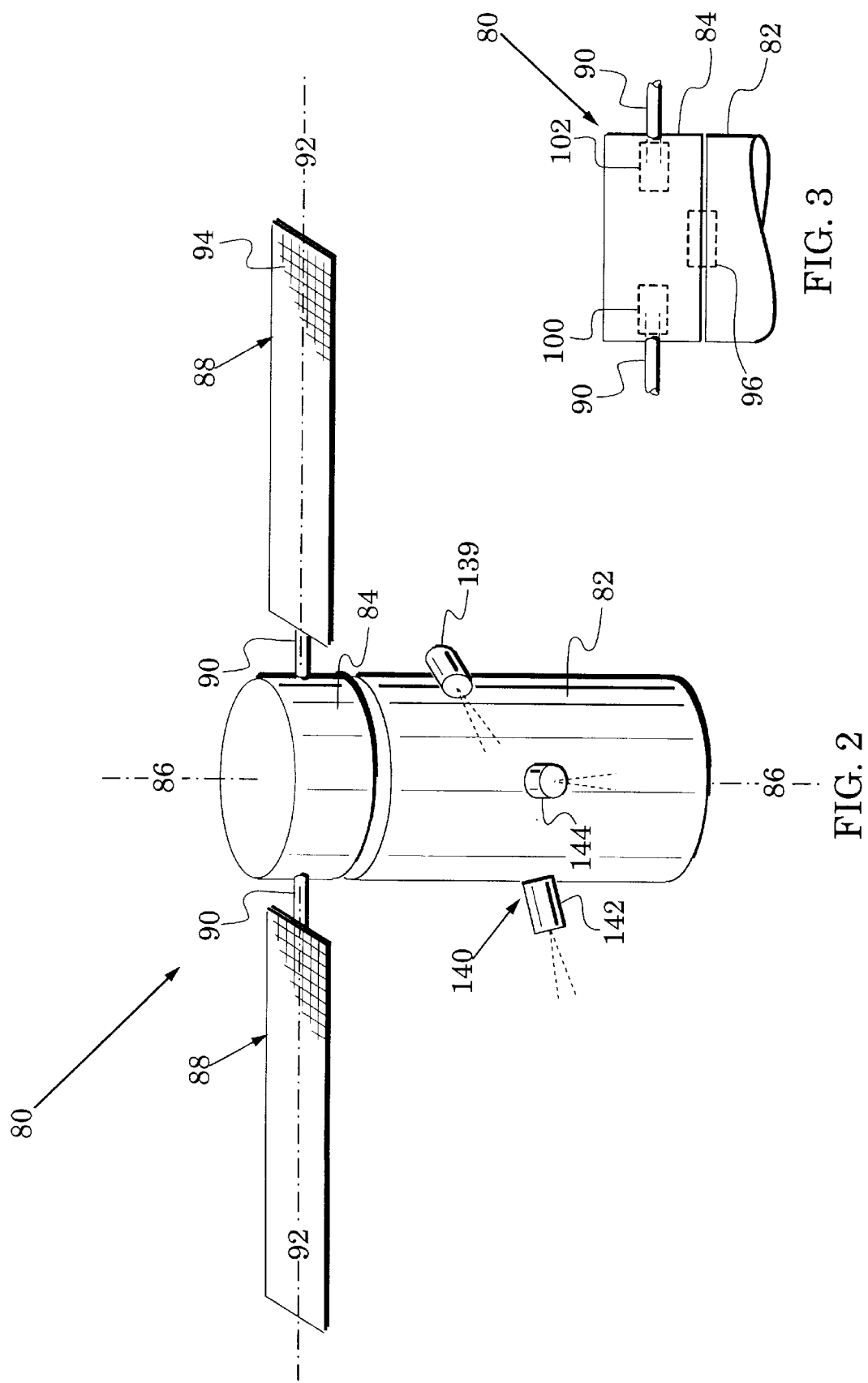

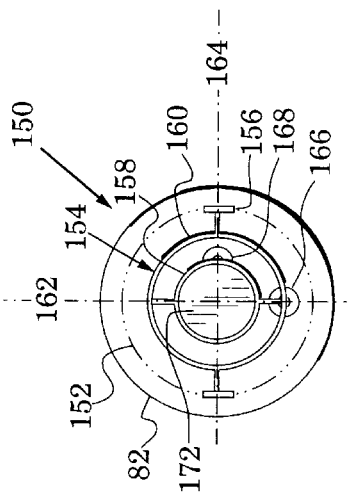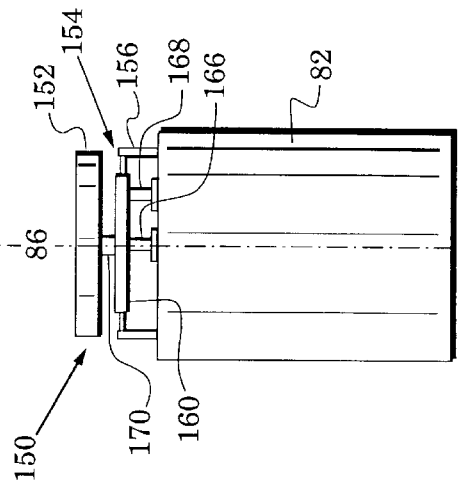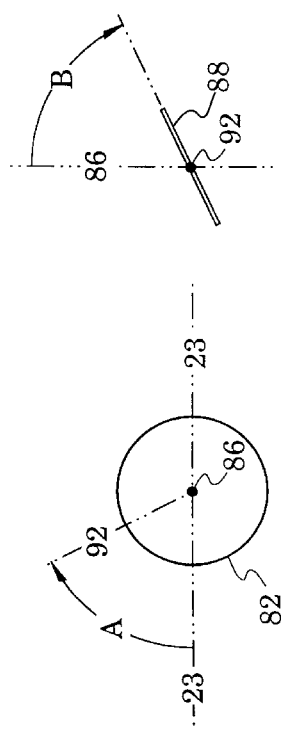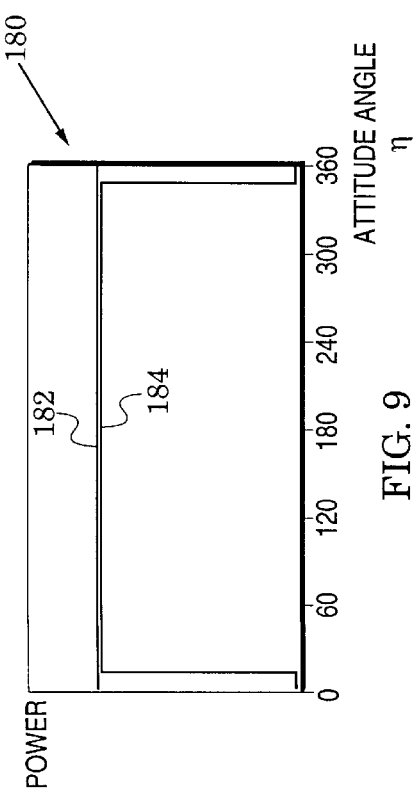

AGILE, SPINNING SPACECRAFT WITH SUN-STEERABLE SOLAR CELL ARRAY AND METHOD

GOVERNMENT RIGHTS

This invention was made with government support under a government contract. The government has certain rights in this invention.

BACKGROUND OF THE INVENTION

1. Field of the Invention

The present invention relates generally to spacecraft and, more particularly, to spinning spacecraft.

2. Description of the Related Art

The perspective view 20 of FIG. 1 illustrates spacecraft which are orbiting the Earth 22 in an orbital plane 23 for various uses (e.g., as communication satellites). Conventional configurations of these spacecraft include body-stabilized spacecraft and spin-stabilized spacecraft which are described in various spacecraft references (e.g., Morgan, Walter L., et al., *Communications Satellite Handbook*, John Wiley & Sons, New York, 1989, pp. 547–554 and 636–641).

In particular, FIG. 1 includes a body-stabilized satellite 24 which is fixed with respect to a coordinate system 26 that has an origin at the satellite's center of mass. The coordinate system 26 has a yaw axis 27 which is directed from the origin towards a point on the Earth 20. A pitch axis 28 is directed from the origin and is orthogonal to the satellite's orbital plane 23. A roll axis 29 is orthogonal to the other two axes and is aligned with the satellite's velocity vector. As the body-stabilized satellite 24 orbits the Earth 22, its yaw axis 27 typically rotates so that it is constantly directed at the Earth's center of mass. Body-stabilized spacecraft generally have momentum wheels (or reaction wheels) and multiple thrusters which are periodically operated to control the spacecraft's attitude with respect to its coordinate system.

As shown in FIG. 1, one or more solar cell arrays 30 are typically extended from the spacecraft on rotatable booms 32 which are generally coaxial with the pitch axis 28. The booms 32 are then rotated so as to keep the solar cell arrays directed towards the Sun as the spacecraft 24 orbits the Earth 22.

The current and power output of the solar cells varies as the cosine of the angle between a normal to the plane of the array and the Sun line (an imaginary line between the Sun and the spacecraft). When the Sun is at spring or fall equinox, the booms can be rotated to place the plane of the solar cell arrays 30 orthogonal to the Sun line. In this orientation, the solar cell arrays receive the maximum energy from the Sun and generate their maximum current output.

Because the ecliptic is rotated from Earth's equatorial plane by ~23.5 degrees, the plane of the solar cell arrays 30 describes the same angle with the Sun line when the Sun is at summer and winter solstice. The current from the solar cells is then approximately 92% (~cosine 23.5 degrees) of the maximum output. This drop in power level can be avoided by rotating the entire spacecraft about its yaw axis 27 so that the solar cell arrays 30 are Sun-steered (maintained in an orthogonal relationship with the Sun line).

In contrast to the body-stabilized satellite 20, all or a significant portion of a spin-stabilized spacecraft rotates at a predetermined rate (e.g., once a second). An exemplary spin-stabilized spacecraft is the spun drum 40 which is also shown orbiting the Earth 22 in FIG. 1. The spun drum has a generally cylindrical shape and rotates about a rotational axis 42 which is its axis of maximum moment of inertia. The spinning is indicated by a rotational vector 43. Because this axis corresponds to a least energy state, the spun drum 40 is passively stable.

The outer surface of the spun drum 40 is covered by a cylindrical array 44 of solar cells. Because of the cylindrical shape, one half of the solar cells are hidden from the Sun at any instant of time and those of the other one half curve away from the Sun. Accordingly, the cylindrical array 44 of the spun drum 40 requires ~ π times as much array area as the flat array 30 of the body-stabilized spacecraft 24 to generate the same current. In addition, the power output of the solar cell array 44 drops during summer and winter solstice for the same reason described above for the body-stabilized spacecraft 24.

The spun drum 40 is sometimes modified to have a portion or shelf 46 which is despun. Equipment (e.g., an antenna 48) can be carried on the shelf 46 and directed at a coverage area on the Earth 22.

Another exemplary spacecraft is the spun deployed-fixed spacecraft 60 of FIG. 1. This spacecraft rotates about a spin axis 62 and the spacecraft is oriented with the spin axis in the orbital plane 23. The spinning is indicated by a rotational vector 63. A plurality of planar panels 64 are canted back from the spin axis 62 and a solar cell array 66 is carried on each side of each panel. With its double-sided solar cell arrays, the spun deployed-fixed spacecraft 60 can maintain a more constant level of generated power than the spun drum 40. However, this advantage is gained with a significant penalty of additional weight and cost due to the large number of solar cells on both sides of the deployed panels 64.

Spin-stabilized and spinning spacecraft are typically less expensive than body-stabilized spacecraft because they are generally less complex (e.g., they require less hardware in the form of momentum wheels and thrusters). Spinning also assists propellant distribution by utilizing centrifugal force. Potentially, this elminates the need for pressurant tanks. Consequently, this class of spacecraft is an attractive choice for many spacecraft missions.

As discussed above, however, the solar cell arrays of spin-stabilized and spinning spacecraft typically cannot generate a constant power output throughout an orbit and/or require an excessive number of solar cells. A nonconstant power output requires that the spacecraft have additional batteries and more complex power processing systems. Additional solar cells add cost, weight and stowed volume. These cost, weight and volume penalties have typically reduced the payload and revenues of spin-stabilized and spinning spacecraft.

SUMMARY OF THE INVENTION

The present invention is directed to an agile, spinning spacecraft which can be directed at various selected targets and which has a Sun-steerable solar cell array.

These goals are achieved with a spacecraft that includes first and second rotatably coupled spacecraft body portions and at least one solar cell array. The second spacecraft body portion is rotatably coupled about a first rotational axis to the first spacecraft body portion and the solar cell array is rotatably coupled about a second rotational axis to the second spacecraft portion. A body actuator is coupled to rotate the second spacecraft body portion relative to the first spacecraft body portion and an array actuator is coupled to rotate the solar cell array relative to the second spacecraft body portion. Preferably, the first and second rotational axes are in an orthogonal relationship. If desirable for some purpose (e.g., to enhance propellant distribution), the first body portion 82 can be spun about the first rotational axis.

The solar cell array is thus Sun-steerable (steered orthogonal to the Sun line) about the first and second rotational axes without limiting the orientation of the first rotational axis. This is in contrast to the body-stabilized spacecraft 24 of FIG. 1 which can only be Sun-steered by rotating the entire spacecraft.

The orientation of the first rotational axis is preferably controlled with an attitude control system that can generate turning moments about transverse axes of the spacecraft. Exemplary attitude control systems include thrusters and linear actuators. In an exemplary arrangement, the actuators are aligned with mutually-orthogonal transverse axes and coupled between the first spacecraft body portion and a rotating momentum wheel.

The teachings of the invention include a set of steering laws which define steering angles about the first and second rotational axes that realize Sun-steering of the solar cell arrays. One set of steering laws is provided for Nadir-pointed spacecraft (first rotational axis oriented at the center of mass of the Earth) and another set is provided for offset-pointed spacecraft (first rotational axis oriented in a selected direction). The recited steering laws apply to the exemplary case in which the first and second rotational axes are mutually orthogonal. They can be modified for other relationships.

Because the teachings of the invention realize Sun-steering of solar cell arrays, they facilitate substantially constant power generation and a reduction in size and weight of solar cells and batteries. The spacecraft can be selectively oriented (i.e., it is agile) since the Sun-steering can be achieved for any orientation of the first rotational axis. Because the solar cell arrays are spaced from the spacecraft exterior (in contrast, for example, to the spun drum 40 of FIG. 1), the spacecraft exterior is available for mounting of other equipment, e.g., thermal radiators that dissipate excess heat.

The novel features of the invention are set forth with particularity in the appended claims. The invention will be best understood from the following description when read in conjunction with the accompanying drawings.

BRIEF DESCRIPTION OF THE DRAWINGS

FIG. 2 is a perspective view of an agile, spinning spacecraft in accordance with the present invention;

FIG. 3 is a partial side elevation view of the agile, spinning spacecraft of FIG. 2 which illustrates actuators of the spacecraft;

FIG. 5A is a view along the first rotational axis of FIG. 2 which defines a steering angle A between an orbital plane and the second rotational axis;

FIG. 5B is a view along the second rotational axis of FIG. 2 which defines a steering angle B between the first rotational axis and the second rotational axis;

FIG. 8A is a top plan view of a spinning portion of the spacecraft of FIG. 4 which illustrates an attitude control system embodiment;

FIG. 8B is a side elevation view of the spacecraft spinning portion and attitude control system of FIG. 8A; and FIG. 9 is a graph of power generated in the agile, spinning spacecraft of FIG. 4 as a function of an angle η of FIG. 6.

DETAILED DESCRIPTION OF THE PREFERRED EMBODIMENTS

Figure 1:
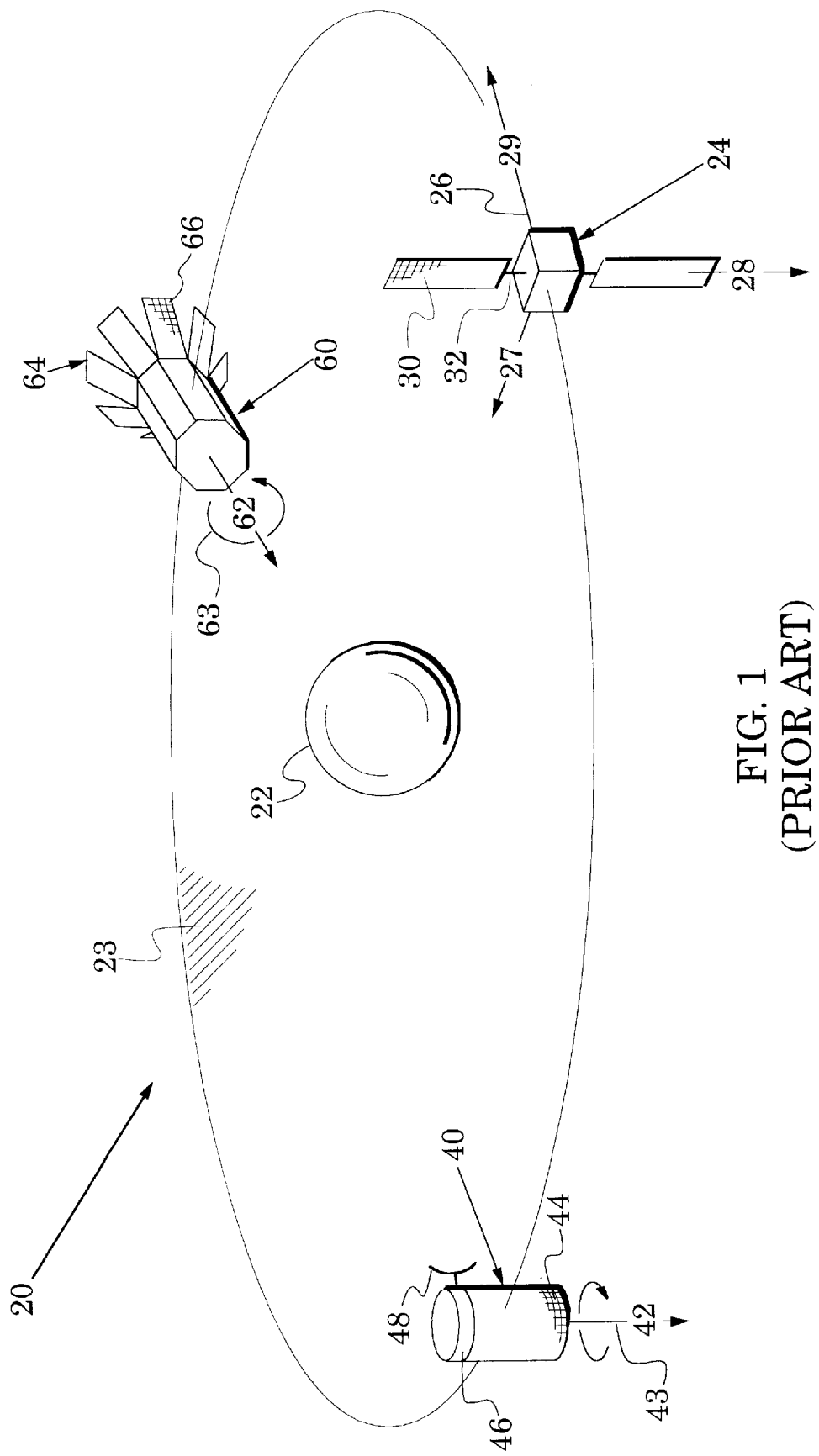
FIG. 1 is a perspective view which illustrates conventional body-stabilized and spin-stabilized spacecrafts in an orbit about the Earth.

FIGS. 2 and 3 illustrate an agile, spinning spacecraft 80 in accordance with the present invention. The spacecraft 80 has a first body portion which spins about a first rotational axis. In addition, the spacecraft has solar cell arrays which are steerable about both the first rotational axis and a second rotational axis to provide substantially constant electrical power as the spacecraft's first rotational axis is directed to any selected orientation.

In particular, the spacecraft 80 includes a first body portion 82 and a second body portion 84 which is rotatably coupled about a rotational axis 86 to the first body portion 82. A pair of planar solar cell arrays 88 extend from the second body portion 84 on booms 90 and are rotatably coupled to the second body portion 84 along a second rotational axis 92 that is preferably orthogonal to the rotational axis 86. Each of the arrays 88 contain a plurality of solar cells 94.

As shown in FIG. 3, a rotary body actuator 96 is positioned between the first and second body portions 82 and 84 to rotate the first body portion 82 relative to the second body portion 84. Rotary array actuators 100 and 102 are positioned in the second body portion 84 and coupled to the booms 90 to rotate the solar cell arrays 88 relative to the second body portion 84. The body actuator 96 and array actuators 100 and 102 are preferably selected from rotary actuators that are generally used in spacecrafts (e.g., stepper electric motors, direct-drive dc and ac electric motors).

The rotary actuators can be positioned on the first and second rotational axes 86 and 92 of FIG. 2 or, alternatively, they can be offset from these axes and coupled by appropriate rotary transmission structures (e.g., gears, chains and belts). Although each boom 90 is driven by a separate actuator in FIG. 3, the booms can be connected in another spacecraft embodiment and driven by a single actuator. Alernatively, the spacecraft 80 can carry only a single boom 90 and a single solar cell array 88.

Figure 4:
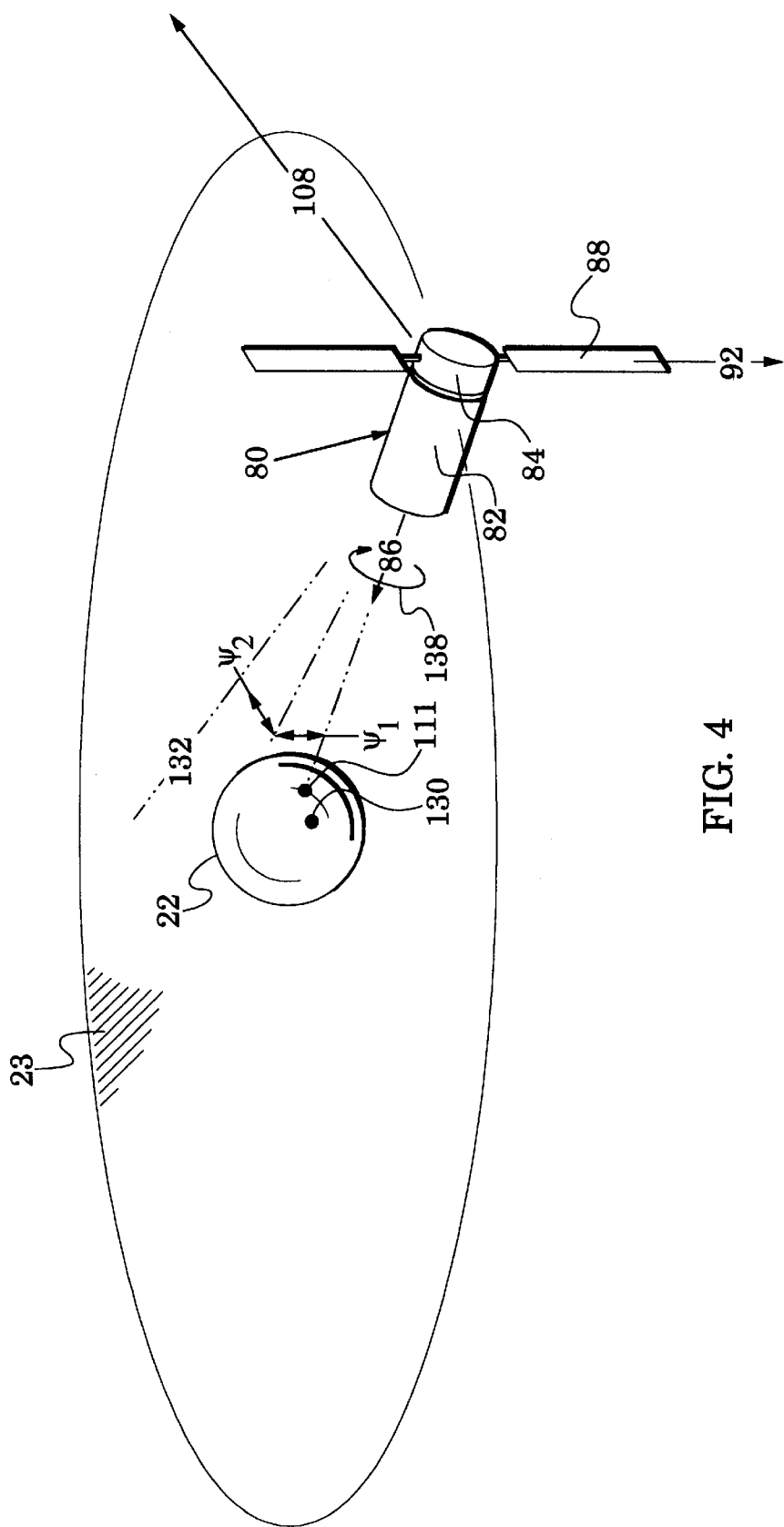
FIG. 4 is a perspective view which illustrates the agile, spinning spacecraft of FIG. 2 in an orbit about the Earth, this view also illustrates Sun-steering of the spacecraft's solar cell arrays about first and second rotational axes.

In operation of the spinning spacecraft 80, it is placed into orbit about the Earth 22 as shown in FIG. 4. The first body portion 82 is spun to have an angular momentum about the first rotational axis 86. In this exemplary illustration, the spacecraft is oriented with the first rotational axis 86 directed in the general direction of the Earth 22 but the first rotational axis can be directed in any selected orientation.

In accordance with a feature of the invention, the solar cell arrays 88 can be Sun-steered (i.e., maintained orthogonal to a Sun line 108 between the spacecraft and the Sun) throughout the orbit of the spacecraft 80. Thus, the solar cell arrays can be operated at their maximum current over substantially the entire orbit. In particular, the solar arrays are rotated about the first rotational axes 86 by a steering angle A that is referenced from the orbital plane 23 and rotated about the second rotational axes 92 by a steering angle B that is referenced from the rotational axis 86.

In accordance with another feature of the invention, the spacecraft 80 includes an attitude control system that facilitates agility, i.e., the ability to redirect the rotational axis 86. This attitude control system generates turning moments that can direct the first rotational axis 86 in any selected orientation. The rotation of the solar cell arrays 88 about the first and second rotational axes 86 and 92 facilitates Sun-steering as the agile spacecraft is placed in different orientations.

In a first exemplary spacecraft attitude, the rotational axis 86 can be directed at a subsatellite point 111 (subsatellite point is that point on the Earth's surface which is intersected by a line from an orbiting spacecraft to the Earth's center of mass).

A set of exemplary steering laws have been derived for this spacecraft attitude that define the magnitudes of the steering angles A and B. For clarity, the steering angles A and B are illustrated respectively in FIGS. 5A and 5B. In FIG. 5A, the steering angle A is taken about the first rotational axis 86 and is measured from the orbital plane 23. This steering angle defines rotation of the second spacecraft body portion (84 in FIGS. 2 and 4) with respect to the second spacecraft body portion 82. In FIG. 5B, the steering angle B locates the plane of the planar solar arrays 88. It is taken about the second rotational axis 92 and is measured from the first rotational axis 86.

Although the invention does not restrict the first and second rotational axes to have an orthogonal relationship, the following steering laws are derived for that exemplary case.

Figure 6:
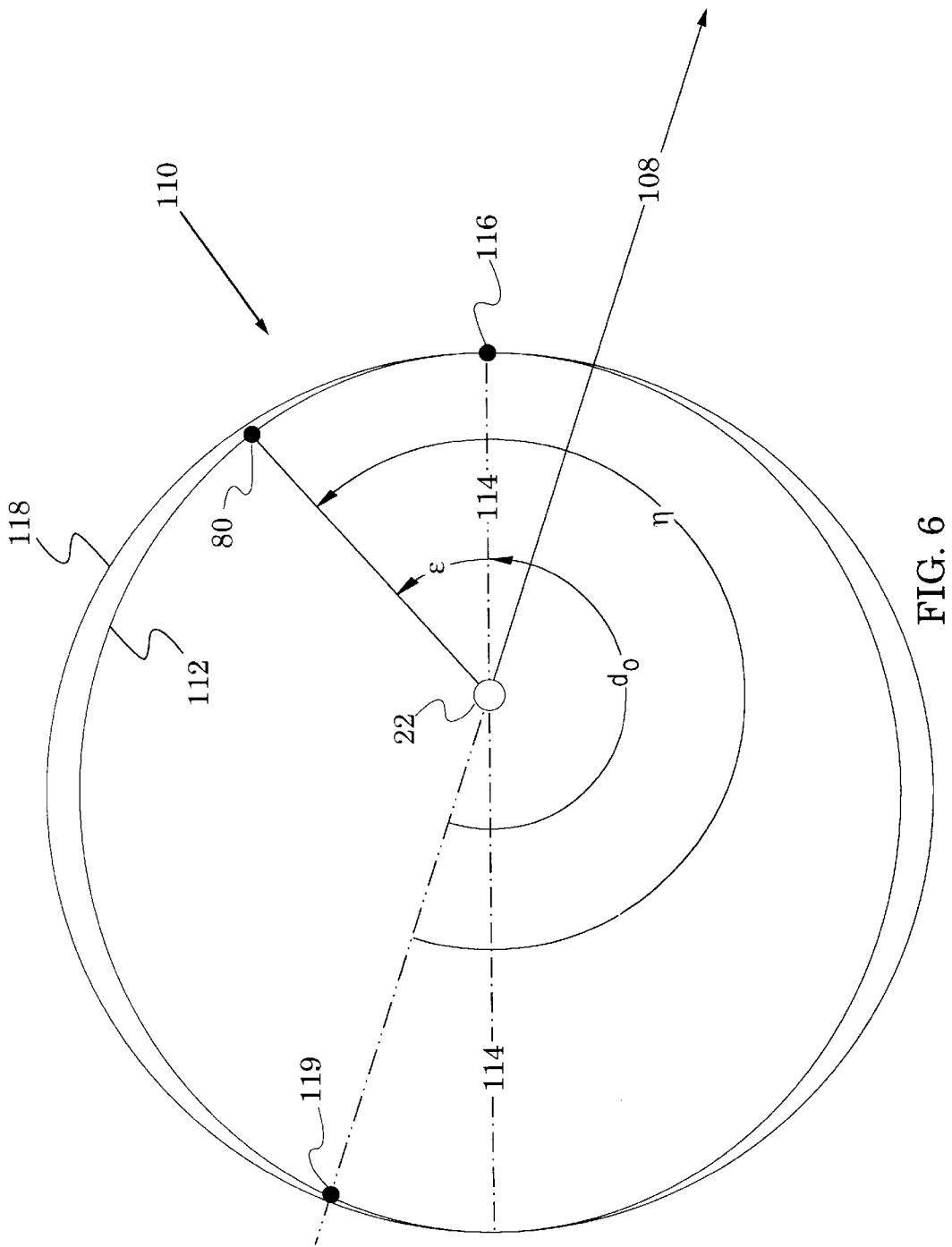
FIG. 6 is a plan view of the orbital plane of FIG. 4 which illustrates a first parameter that is used in deriving the steering angles A and B o FIGS. 5A and 5B.
Figure 7:
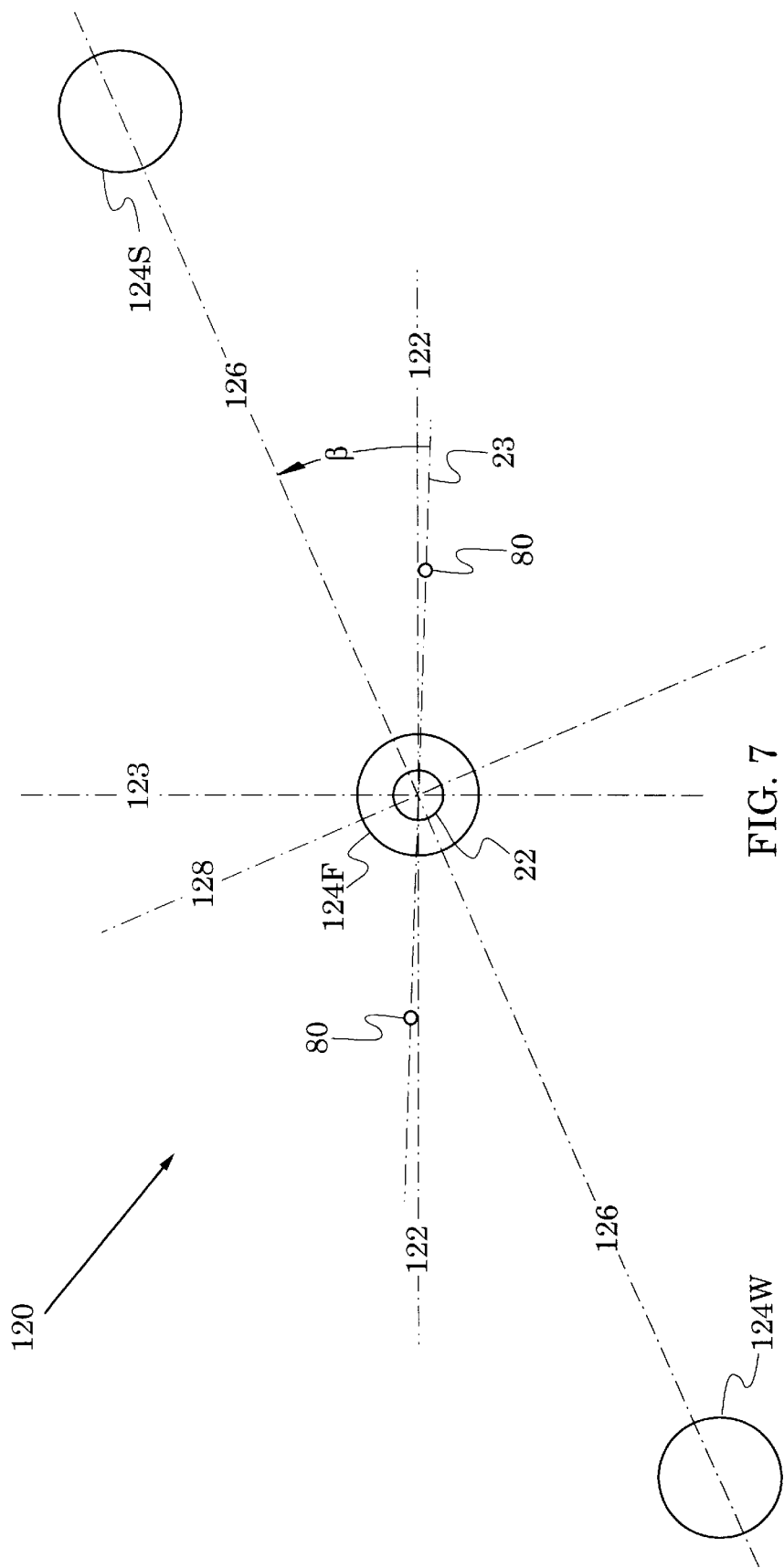
FIG. 7 is a side elevation view of the orbital plane of FIG. 4 which illustrates a second parameter that is used in deriving the steering angles A and B of FIGS. 5A and 5B.

The steering laws for the steering angles A and B are defined with respect to orbital parameters $\eta$ and $\beta$. These parameters are illustrated in FIGS. 6 and 7 which are views respectively orthogonal and parallel to the orbital plane 23 of FIG. 4. In the view 110 of FIG. 6, it is assumed for generality that the orbit of the spacecraft 80 is an elliptical orbit 112 which has a major axis 114 and a perigee 116. The Earth 22 is at the focus of the ellipse closest to perigee 116. In a particular orbital case, the orbit's eccentricity could be zero so that the orbit is then a circular orbit 118. A spacecraft's true anomaly $\epsilon$ is the angle between perigee 116 and the spacecraft 80. If an angle $d_o$ is defined as the angle between midnight 119 (a position on the orbit 112 intersected by an extension of the Sun line 110) and perigee 116, then the parameter $\eta$ is the angle between midnight and the spacecraft 80, i.e. the angle $\eta = \epsilon + d_o$.

In the view 120 of FIG. 7, the Earth 22 is shown with its equatorial plane 122 and equatorial pole 123. A Sun 124 is shown at positions 124S (summer solstice), 124F (fall equinox) and 124W (winter solstice) along an ecliptic 126. The ecliptic 126 has an ecliptic pole 128 which is angled (at ~23.5 degrees) from the equatorial pole 123. For generality, the orbital plane 23 of the spacecraft 80 is shown inclined from the equatorial plane 122. The parameter $\beta$ is the elevation angle between the Sun 124 and the orbital plane 23. In FIG. 7, the parameter $\beta$ is shown for a specific case in which the Sun is at its position 124S, i.e., at summer solstice.

With reference to the angles $\eta$ and $\beta$ of FIGS. 6 and 7, the steering angle A is given by A=ATAN2(sinA, cosA) in which ATAN2 is a four-quadrant solution of an arctangent function, $\sin A = \sin\beta/\{(\sin\beta)^2 + (\cos\beta \sin\eta)^2\}^{1/2}$ and $\cos A = (\cos\beta \sin\eta)/\{(\sin\beta)^2 + (\cos\beta \sin\eta)^2\}^{1/2}$ (a four-quadrant solution is one that takes into account the proper sign of the sine and cosine functions and returns a value of A between $-\pi$ and $\pi$ radians). The steering angle B is given by B=ATAN2(sinB, cosB) in which $\sin B = \{(\sin\beta)^2 + (\cos\beta \sin\eta)^2\}^{1/2}$ and $\cos B = \cos\beta \cos\eta$.

In a second (and more general) exemplary spacecraft attitude, the rotational axis 86 can be offset from the subsatellite point 111 in FIG. 4. In particular, the rotational axis 86 can be offset from the orbital plane 23 by an angle $\psi_1$ and offset parallel to the orbital plane by an angle $\psi_2$ as shown in FIG. 4. Depending upon the magnitudes of the offset angles, the rotational axis 86 may be directed to a point 130 on the Earth 22 that is offset from the subsatellite point 111 or directed along a line 132 that passes by the Earth 22.

In this offset spacecraft attitude, the original steering angles A and B can be respectively designated as offset steering angles $A_{off}$ and $B_{off}$. With reference to the angles $\eta$ and $\beta$ of FIGS. 6 and 7, the steering angle $B_{off}$=ATAN2 $(\sin B_{off}, \cos B_{off})$ in which $\sin B_{off} = \{(\sin\beta \cos\psi_1 + \cos\beta \cos\eta \sin\psi_1)^2 + (\cos\beta \sin\eta \cos\psi_2 - \sin\beta \sin\psi_1 \sin\psi_2 + \cos\beta \cos\eta \cos 104_1 \sin\psi_2)^2\}^{1/2}$ and $\cos B_{off} = \cos\beta \cos\eta \cos\psi_1 \cos\psi_2 - \cos\beta \sin\eta \sin\psi_2 - \sin\beta \sin\psi_1 \cos\psi_2$. The steering angle $A_{off}$= ATAN2$(\sin A_{off}, \cos A_{off})$ in which $\sin A_{off} = (\sin\beta \cos\psi_1 + \cos\beta \sin\eta \sin\psi_1)/\sin B_{off}$ and $\cos A_{off} = (\cos\beta \sin\eta \cos\psi_2 - \sin\beta \sin\psi_1 \sin\psi_2 - \cos\beta \cos\eta \cos\psi_1 \sin\psi_2)/\sin B_{off}$.

The steering angle A rotates the second rotational axis 92 to place the second rotational axis (92 in FIG. 4) orthogonal to the Sun line 108 throughout the spacecraft orbit. In accordance with the steering angle A, for example, the second rotational axis 92 is positioned orthogonal to the ecliptic (126 in FIG. 7) at summer and winter solstice and in the orbital plane (23 in FIG. 7) at spring and fall equinox. The steering angle B then rotates the solar cell arrays (88 in FIG. 4) to be orthogonal to the Sun line 108.

In FIG. 4, the first spacecraft body portion 82 of the spacecraft 80 is spinning about the rotational axis 86 at a predetermined rotational velocity (e.g., once a second) as indicated by the rotational vector 138. For this purpose, a thruster 139 (e.g., a monopropellant, a bipropellant or an ion thruster) can be carried on the first spacecraft body portion 82 and oriented to impart a tangential force as shown in FIG. 2. This tangential force generates a turning moment which can be used to realize a predetermined rotational velocity.

As mentioned above, the attitude of the spacecraft 80 can be positioned with the rotational axis 86 directed in any selected orientation such as towards points 111 or 130 on the Earth 22 or along an offset axis 132 that passes by the Earth 22. This agility is realized with an attitude control system that generates turning moments on the agile, spinning spacecraft 80 to control the direction of the rotational axis 86.

A first embodiment 140 of the attitude control system is shown in FIG. 2. It includes exemplary thrusters 142 and 144 which are offset from the center of mass of the spacecraft 80. In general, such thrusters are positioned so as to generate turning moments about transverse spacecraft axes, i.e. axes that are orthogonal to the rotational axis 86. These turning moments about transverse spacecraft axes direct the rotational axis 86 of the agile, spinning spacecraft in selected orientations as shown in FIG. 4.

A second embodiment 150 of the attitude control system is shown in FIGS. 8A and 8B. The structure 150 is taught in U.S. Pat. No. 5,441,222 which was issued Aug. 15, 1995 in the name of Harold A. Rosen and assigned to Hughes Aircraft Company, the assignee of the present invention. In FIGS. 8A and 8B, a momentum wheel 152 is coupled to the first spacecraft body portion 82 by a two-axis gimbal 154. The gimbal 154 is carried by supports 156 and has inner and outer annular rings 158 and 160 that facilitate rotation respectively about orthogonal transverse axes 162 and 164.

A pair of linear actuators 166 and 168 (e.g., electromagnetic force generators) are shown to be aligned respectively with the orthogonal axes 162 and 164. The actuator 166 is coupled between the first spacecraft body portion 82 and the outer angular ring 160. Similarly, the actuator 168 is coupled between the first spacecraft body portion 82 and the inner angular ring 158. For clarity of illustration, the momentum wheel 152 is indicated by a broken perimeter line in FIG. 8A. The momentum wheel 152 is coupled to the inner ring 158 with a wheel shaft 170 and a web 172 that spans the inner ring 158.

In operation of the attitude control system 150, the angular momentum of the momentum wheel 152 resists movement about the transverse axes 162 and 164 so that activation of the actuators 166 and 168 generate turning moments in the first spacecraft body portion 82 respectively about the orthogonal transverse axes 162 and 164. Similar to the action of the attitude control system 140 of FIG. 2, these turning moments about orthogonal transverse axes direct the rotational axis 86 of the agile, spinning spacecraft to any selected orientation (e.g., as shown in FIG. 4).

The momentum wheel 152 and the first spacecraft body portion 82 preferably spin in opposite directions to enhance the agility of the agile, spinning spacecraft (80 in FIG. 4). This opposite spin causes the spacecraft to approximate a zero momentum system.

Although the attitude control system 150 of FIGS. 8A and 8B is exemplified with linear actuators 166 and 168 that are aligned with the orthogonal axes 162 and 164, the teachings of the invention include any actuator arrangement which can generate turning moments about transverse spacecraft axes.

Because the solar cell arrays 88 can be steered about the first and second rotational axes 86 and 92, the agile, spinning spacecraft 80 of FIG. 4 is able to generate a substantially constant current or power from its solar cells. This is illustrated in the graph 180 of FIG. 9 where power is plotted with respect to the angle η of FIG. 6.

As shown by plot 182, the power remains constant for all angles of η when the Sun is at summer or winter solstice (124S and 124W in FIG. 7). Because the solar cell arrays are maintained orthogonal to the Sun line (108 in FIG. 4) at all times, this power level is the maximum that can be generated by the solar cells. Only during spring and fall equinox (124F in FIG. 7) when the spacecraft is shaded by the Earth in the vicinity of η=180 degrees (local midnight), does the solar cell power dip from its maximum level as indicated by plot 184 (for clarity of illustration, the level of plot 184 is offset from the level of plot 182 at η=0 degrees, these levels are substantially equal).

In contrast, the solar cell array power of conventional spacecraft typically vary throughout their orbit. For example, the power of the arrays of the spun drum 40 of FIG. 1 drop during spring and fall equinox in accordance with the angle between the orbital plane and the ecliptic. Alternatively, if the spun drum 40 were oriented similarly to the agile, spinning spacecraft 80 of FIG. 4, it would exhibit a severe power loss at η=180 degrees because an end of its cylindrical solar cell array would be facing the Sun line (108 in FIG. 4). Although this end can also carry solar cells, it typically represents a severely reduced area.

In addition, the spun drum 40 must carry a much heavier load of solar arrays and batteries because of the configuration of its cylindrical array 44. For purposes of comparison, it has been calculated that a 63 kilogram solar array and a 68 kilogram battery pack on the agile, spinning spacecraft 80 of FIG. 4 can match the power supplying capabilities of a 172 kilogram solar array and a 113 kilogram battery pack on the spun drum 40 of FIG. 1.

Although the arrays 66 of the spun deployed-fixed spacecraft 60 of FIG. 1 generate a more constant power output than the spun drum 40, this is realized at the cost of a large number of solar cell arrays which are carried on both sides of a plurality of panels 64. Accordingly, it has been calculated that a 63 kilogram solar array on the agile, spinning spacecraft 80 of FIG. 4 can match the power supplying capabilities of 245 kilograms of solar arrays on the spun deployed-fixed spacecraft 60.

Similar to the spun drum 40, the arrays 30 of the body-stabilized spacecraft 24 of FIG. 1 also drop in power during spring and fall equinox in accordance with the angle between the spacecraft's orbital plane and the ecliptic. In contrast to the agile, spinning spacecraft 80 of FIG. 4, the solar arrays 30 can be Sun-steered only by rotating the entire spacecraft about its yaw axis 27.

With respect to conventional spacecraft, therefore, agile, spinning spacecraft of the invention offer significant reductions in weight and volume of solar cell arrays and batteries. In addition, the Sun-steering of the agile, spinning spacecraft of the invention is not compromised as the spacecraft is placed in selected orientations. As the first rotational axis 86 is redirected as shown in FIG. 4, the steering laws of the invention continue to place the solar cell arrays orthogonal to the Sun line. The teachings of the invention, e.g., its steering laws) have been generalized and can be applied to any selected orbital path.

Although the steering laws have been recited for an exemplary case in which the first and second rotational axes have an orthogonal relationship, they can be modified for other cases and the invention is not restricted to that exemplary relationship.

The invention has been described with reference to a spacecraft 20 of FIG. 4 in which a first body portion 82 is spinning for some purpose (e.g., to enhance propellant distribution). In general, however, the invention teaches a spacecraft in which a second spacecraft body portion is rotatably coupled to a first spacecraft body portion whether the first body portion 82 is spinning or not.

In contrast to the large solar cell arrays of the spun drum 40 and the spun deployed-fixed spacecraft 60 of FIG. 1, the planar solar cell arrays 88 of the spinning spacecraft 80 of FIG. 4 can be folded and stowed for launch. Because the launch configuration thus occupies a relatively small volume, an additional volume is made available for the spacecraft's payload.

In the present invention, solar cell arrays are spaced from the body of the spacecraft. Therefore, in contrast with the spun drum 40 of FIG. 1, exterior space is available for thermal radiators which can be patterned to meet the thermal dissipation requirements of various spacecraft payloads.

Although FIG. 2 shows that a spacecraft's solar cell array is formed of two sub-arrays (the planar solar cell arrays 88) on either side of the the first rotational axis 86, the teachings of the invention can be extended to a greater number of sub-arrays or to a single sub-array which is carried on one side of the first rotational axis 86. Although the solar cell arrays 88 of FIG. 2 are preferably planar, the generated power of other array embodiments can also be enhanced with the first and second rotational steering axes that are taught by the invention.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

REFERENCE NUMBERS view 20
Earth 22
orbital plane 23
body-stablilized spacecraft 24
coordinate system 26
yaw axis 27
pitch axis 28
roll axis 29
solar cell arrays 30
booms 32
spun drum 40
rotational axis 42
rotational vector 43
solar cell array 44
shelf 46
antenna 48
spun deployed-fixed 60
rotational axis 62
rotational vector 63
panels 64
solar cell arrays 66
spinning spacecraft 80
first body portion 82
second body portion 84
rotational axis 86
body actuator 96
planar solar cell array 88
solar cells 94
booms 90
rotational axis 92
array actuators 100, 102
views 110, 120
sun line 108
subsatellite point 111
offset point 130
line 132
elliptical orbit 112
semimajor axis 114
perigee 116
circular orbit 118
midnight 119
equitorial plane 122
equitorial ploe 123
Sun smr solstice 124smr
Sun fall equinox 124fall
Sun winter solstice 24wntr
ecliptic 126
ecliptic pole 128
rotational vector 138
tangential thruster 139
attitude control system 140
thruster 142, 144
attitude control system 150
mom wheel 152
shaft 170
gimbal 154
supports 156
inner ring 158
web 172
outer ring 160
transverse axes 162, 164
linear actuators 166, 168
graph 170
plots 172, 174

We claim:

1. A method of positioning a spacecraft in a selected orientation while Sun-steering a solar cell array of said spacecraft as said spacecraft moves in an orbital plane about an Earth in which a Sun has an elevation angle $\beta$ from said orbital plane and said spacecraft has an angle $\eta$ from midnight, comprising the steps of:

spinning a body portion of said spacecraft to generate an angular momentum;

spinning a momentum wheel of said spacecraft to reduce said angular momentum and enhance spacecraft agility;

generating turning moments in said spacecraft to realize said selected orientation; and steering said array about first and second mutually orthogonal spacecraft axes to direct said array at said Sun;

wherein said selected orientation directs said first spacecraft axis at a subsatellite point and said steering step includes the steps of:

rotating said array about said first axis in accordance with a steering angle A from said orbital plane wherein said steering angle $A=ATAN2(\sin A, \cos A)$ in which ATAN2 is a four-quadrant solution of an arctangent function, $\sin A = \sin\beta / \{(\sin\beta)^2 + (\cos\beta \sin\eta)^2\}^{1/2}$ and $\cos A = (\cos\beta \sin\eta)/\{(\sin\beta)^2 + (\cos\beta \sin\eta)^2\}^{1/2}$; and rotating said array about said second axis in accordance with a steering angle B from said first spacecraft axis wherein said steering angle $B=ATAN2(\sin B, \cos B)$ in which ATAN2 is a four-quadrant solution of an arctangent function, $\sin B = \{(\sin\beta)^2 + (\cos\beta \sin\eta)^2\}^{1/2}$ and $\cos B = \cos\beta \cos\eta$.

2. A method of positioning a spacecraft in a selected orientation while Sun-steering a solar cell array of said spacecraft as said spacecraft moves in an orbital plane about an Earth in which a Sun has an elevation angle $\beta$ from said orbital plane and said spacecraft has an angle $\eta$ from midnight, comprising the steps of:

spinning a body portion of said spacecraft to generate an angular momentum;

spinning a momentum wheel of said spacecraft to reduce said angular momentum and enhance spacecraft agility;

generating turning moments in said spacecraft to realize said selected orientation; and steering said array about first and second mutually orthogonal spacecraft axes to direct said array at said Sun;

wherein said selected orientation offsets said first spacecraft axis from a subsatellite point by an angle $\psi_1$ orthogonal to said orbital plane and by an angle $\psi_2$ in said orbital plane and said steering step includes the steps of:

rotating said array about said second axis in accordance with an offset steering angle $B_{off}$ wherein said offset steering angle $B_{off}=ATAN2(\sin B_{off}, \cos B_{off})$ in which ATAN2 is a four-quadrant solution of an arctangent function, $\sin B_{off} = \{(\sin\beta \cos\psi_1 + \cos\beta \cos\eta \sin\psi_1)^2 + (\cos\beta \sin\eta \cos\psi_2 - \sin\beta \sin\psi_1 \sin\psi_2 + \cos\beta \cos\eta \cos\psi_1 \sin\psi_2)^2\}^{1/2}$ and $\cos B_{off} = \cos\beta \cos\eta \cos\psi_1 \cos\psi_2 - \cos\beta \sin\eta \sin\psi_2 - \sin\beta \sin\psi_1 \cos\psi_2$; and rotating said array about said first axis in accordance with an offset steering angle $A_{off}$ wherein said offset steering angle $A_{off}=ATAN2(\sin A_{off}, \cos A_{off})$ in which ATAN2 is a four-quadrant solution of an arctangent function, $\sin A_{off} = (\sin\beta \cos\psi_1 + \cos\beta \sin\eta \sin\psi_1)/\sin B_{off}$ and $\cos A_{off} = (\cos\beta \sin\eta \cos\psi_2 - \sin\beta \sin\psi_1 \sin\psi_2 - \cos\beta \cos\eta \cos\psi_1 \sin\psi_2)/\sin B_{off}$.

3. A method of offsetting a first axis of a spacecraft from a subsatellite point on an Earth while Sun-steering a solar cell array of said spacecraft as said spacecraft moves in an orbital plane about said Earth wherein a Sun has an elevation angle $\beta$ from said orbital plane and said spacecraft has an angle $\eta$ from midnight, comprising the steps of:

spinning a body portion of said spacecraft in a first angular direction about said first axis to generate an angular momentum;

spinning a member of said spacecraft in a second and opposite angular direction to reduce said angular momentum and enhance spacecraft agility;

generating turning moments in said spacecraft to offset said first axis from said subsatellite point by an angle $\psi_1$ orthogonal to said orbital plane and by an angle $\psi_2$ in said orbital plane;

steering said array about said first axis and a substantially orthogonal second axis to direct said array at said Sun wherein said array is steered to have a first offset steering angle $A_{off}$ from said orbital plane and is steered to have a second offset steering angle $B_{off}$ from said first axis; and deriving said first and second offset steering angles $A_{off}$ and $B_{off}$ from said angles $\beta$, $\eta$, $\psi_1$ and $\psi_2$.

4. The method of claim 3, wherein said spinning steps each include a step of orienting said spinning to be about said first axis.

5. The method of claim 3, wherein said generating step includes the steps of:

coupling at least one actuator between said body portion and said member; and actuating said actuator to realize said turning moments.

6. The method of claim 3, wherein said member is a momentum wheel.

7. The method of claim 3, wherein said spacecraft has a center of mass and said generating step includes the steps of:

offsetting at least one thruster from said center of mass; and firing said thruster to realize said turning moments.

8. The method of claim 3, wherein said deriving step includes the steps of:

setting said offset steering angle $B_{off}$=ATAN2(sin$B_{off}$, cos$B_{off}$) in which ATAN2 is a four-quadrant solution of an arctangent function, sin $B_{off}$={(sin$\beta$ cos$\psi_1$+cos$\beta$ cos$\eta$ sin$\psi_1$)$^2$+(cos$\beta$ sin$\eta$ cos$\psi_2$−sin$\beta$ sin$\psi_1$ sin$\psi_2$+cos$\beta$ cos$\eta$ cos$\psi_1$ sin$\psi_2$)$^2$}$^{1/2}$ and cos $B_{off}$=cos$\beta$ cos$\eta$ cos$\psi_1$ cos$\psi_2$−cos$\beta$ sin$\eta$ sin$\psi_2$−sin$\beta$ sin$\psi_1$ cos$\psi_2$; and setting said offset steering angle $A_{off}$=ATAN2(sin$A_{off}$, cosAoff) in which ATAN2 is a four-quadrant solution of an arctangent function, sin $A_{off}$=(sin$\beta$ cos$\psi_1$+cos$\beta$ sin$\eta$ sin$\psi_1$)/sin $B_{off}$ and cos $A_{off}$=(cos$\beta$ sin$\eta$ cos$\psi_2$−sin$\beta$ sin$\psi_1$ sin$\psi_2$−cos$\beta$ cos$\eta$ cos$\psi_1$ sin$\psi_2$)/sin $B_{off}$.

9. A method of directing a first axis of a spacecraft to have a selected orientation while Sun-steering a solar cell array of said spacecraft as said spacecraft moves in an orbital plane about an Earth wherein a Sun has an elevation angle $\beta$ from said orbital plane and said spacecraft has an angle $\eta$ from midnight, comprising the steps of:

spinning a body portion of said spacecraft in a first angular direction to generate an angular momentum;

spinning a member of said spacecraft in a second and opposite angular direction to reduce said angular momentum and enhance spacecraft agility;

generating turning moments in said spacecraft to realize said selected orientation; and steering said array about said first axis and a substantially orthogonal second axis to direct said array at said Sun;

wherein said selected orientation offsets said first axis from a subsatellite point by an angle $\psi_1$ orthogonal to said orbital plane and by an angle $\psi_2$ in said orbital plane and said steering step includes the steps of:

rotating said array about said second axis in accordance with an offset steering angle $B_{off}$ wherein said offset steering angle $B_{off}$=ATAN2(sin$B_{off}$, cos$B_{off}$) in which ATAN2 is a four-quadrant solution of an arctangent function, sin $B_{off}$={(sin$\beta$ cos$\psi_1$+cos$\beta$ cos$\eta$ sin$\psi_1$)$^2$+(cos$\beta$ sin$\eta$ cos$\psi_2$−sin$\beta$ sin$\psi_1$ sin$\psi_2$+cos$\beta$ cos$\eta$ cos$\psi_1$ sin$\psi_2$)$^2$}$^{1/2}$ and cos $B_{off}$=cos$\beta$ cos$\eta$ cos$\psi_1$ cos$\psi_2$−cos$\beta$ sin$\eta$ sin$\psi_2$−sin$\beta$ sin$\psi_1$ cos$\psi_2$; and rotating said array about said first axis in accordance with an offset steering angle $A_{off}$ wherein said offset steering angle $A_{off}$=ATAN2(sin$A_{off}$, cos$A_{off}$) in which ATAN2 is a four-quadrant solution of an arctangent function, sin $A_{off}$=(sin$\beta$ cos$\psi_1$+cos$\beta$ sin$\eta$ sin$\psi_1$)/sin $B_{off}$ and cos $A_{off}$=(cos$\beta$ sin$\eta$ cos$\psi_2$−sin$\beta$ sin$\psi_1$ sin$\psi_2$−cos$\beta$ cos$\eta$ cos$\psi_1$ sin$\psi_2$)/sin $B_{off}$.

10. The method of claim 9, wherein at least one of $\psi_1$ and $\psi_2$ is substantially zero.

11. A method of offsetting a first axis of a spacecraft from a subsatellite point on an Earth while Sun-steering a solar cell array of said spacecraft as said spacecraft moves in an orbital plane about said Earth wherein a Sun has an elevation angle $\beta$ from said orbital plane and said spacecraft has an angle $\eta$ from midnight, comprising the steps of:

spinning a body portion of said spacecraft in a first angular direction about said first axis to generate an angular momentum;

spinning a momentum wheel of said spacecraft in a second and opposite angular direction about said first axis to reduce said angular momentum and enhance spacecraft agility;

coupling at least one actuator between said body portion and said momentum wheel;

activating said actuator to realize turning moments that offset said first axis from said subsatellite point by an angle $\psi_1$ orthogonal to said orbital plane and by an angle $\psi_2$ in said orbital plane;

steering said array about said first axis and a substantially orthogonal second axis to direct said array at said Sun wherein said array is steered to a first offset steering angle $A_{off}$ from said orbital plane and is steered to a second offset steering angle $B_{off}$ from said first axis; and deriving said first and second offset steering angles $A_{off}$ and $B_{off}$ from said angles $\beta$, $\eta$, $\psi_1$ and $\psi_2$.

12. The method of claim 11, wherein at least one of $\psi_1$ and $\psi_2$ is substantially zero.

13. The method of claim 11, wherein said deriving step includes the steps of:

setting said offset steering angle $B_{off}$=ATAN2(sin$B_{off}$, cos$B_{off}$) in which ATAN2 is a four-quadrant solution of an arctangent function, sin $B_{off}$={(sin$\beta$ cos$\psi_1$+cos$\beta$ cos$\eta$ sin$\psi_1$)$^2$+(cos$\beta$ sin$\eta$ cos$\psi_2$−sin$\beta$ sin$\psi_1$ sin$\psi_2$+cos$\beta$ cos$\eta$ cos$\psi_1$ sin$\psi_2$)$^2$}$^{1/2}$ and cos $B_{off}$=cos$\beta$ cos$\eta$ cos$\psi_1$ cos$\psi_2$−cos$\beta$ sin$\eta$ sin$\psi_2$−sin$\beta$ sin$\psi_1$ cos$\psi_2$; and setting said offset steering angle $A_{off}$=ATAN2(sin$A_{off}$, cos$A_{off}$) in which ATAN2 is a four-quadrant solution of an arctangent function, sin $A_{off}$=(sin$\beta$ cos$\psi_1$+cos$\beta$ sin$\eta$ sin$\psi_1$)/sin $B_{off}$ and cos $A_{off}$=(cos$\beta$ sin$\eta$ cos$\psi_2$−sin$\beta$ sin$\psi_1$ sin$\psi_2$−cos$\beta$ cos$\eta$ cos$\psi_1$ sin$\psi_2$)/sin $B_{off}$.

14. A method of directing a first axis of a spacecraft to have a selected orientation while Sun-steering a solar cell array of said spacecraft as said spacecraft moves in an orbital plane about an Earth wherein a Sun has an elevation angle $\beta$ from said orbital plane and said spacecraft has an angle $\eta$ from midnight, comprising the steps of:

spinning a body portion of said spacecraft in a first angular direction about said first axis to generate an angular momentum;

spinning a momentum wheel in a second and opposite angular direction about said first axis to reduce said angular momentum and enhance spacecraft agility;

coupling at least one actuator between said body portion and said momentum wheel;

activating said actuator to realize said selected orientation; and steering said array about said first axis and a substantially orthogonal second axis to direct said array at said Sun;

wherein said selected orientation offsets said first axis from a subsatellite point by an angle $\psi_1$ orthogonal to said orbital plane and by an angle $\psi_2$ in said orbital plane and said steering step includes the steps of:

rotating said array about said second rotational axis in accordance with an offset steering angle $B_{off}$ wherein said offset steering angle $B_{off}=\text{ATAN2}(\sin B_{off}, \cos B_{off})$ in which ATAN2 is a four-quadrant solution of an arctangent function, $\sin B_{off}=\{(\sin\beta \cos\psi_1 + \cos\beta \cos\eta \sin\psi_1)^2 + (\cos\beta \sin\eta \cos\psi_2 - \sin\beta \sin\psi_1 \sin\psi_2 + \cos\beta \cos\eta \cos\psi_1 \sin\psi_2)^2\}^{1/2}$ and $\cos B_{off} = \cos\beta \cos\eta \cos\psi_1 \cos\psi_2 - \cos\beta \sin\eta \sin\psi_2 - \sin\beta \sin\psi_1 \cos\psi_2$; and rotating said array about said first axis in accordance with an offset steering angle $A_{off}$ wherein said offset steering angle $A_{off}=\text{ATAN2}(\sin A_{off}, \cos A_{off})$ in which ATAN2 is a four-quadrant solution of an arctangent function, $\sin A_{off}=(\sin\beta \cos\psi_1 + \cos\beta \sin\eta \sin\psi_1)/\sin B_{off}$ and $\cos A_{off}=(\cos\beta \sin\eta \cos_2 - \sin\beta \sin\psi_1 \sin\psi_2 - \cos\beta \cos\eta \cos\psi_1 \sin\psi_2)/\sin B_{off}$.

15. The method of claim 14, wherein at least one of $\psi_1$ and $\psi_2$ is substantially zero.

* * * * *